United States Patent
Pyo et al.

(10) Patent No.: US 11,605,502 B2
(45) Date of Patent: Mar. 14, 2023

(54) MULTILAYER ELECTRONIC COMPONENT

(71) Applicant: SAMSUNG ELECTRO-MECHANICS CO., LTD., Suwon-si (KR)

(72) Inventors: Hye Sung Pyo, Suwon-si (KR); Ho In Jun, Suwon-si (KR); Ki Hun Jeon, Suwon-si (KR); Do Hyun Hong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 59 days.

(21) Appl. No.: 17/330,024

(22) Filed: May 25, 2021

(65) Prior Publication Data

US 2022/0189689 A1     Jun. 16, 2022

(30) Foreign Application Priority Data

Dec. 14, 2020 (KR) .......................... 10-2020-0174343

(51) Int. Cl.
*H01G 4/005* (2006.01)

(52) U.S. Cl.
CPC .................................. *H01G 4/005* (2013.01)

(58) Field of Classification Search
CPC ...... H01G 4/005; H01G 4/0085; H01G 4/012; H01G 4/1209; H01G 4/1227; H01G 4/224; H01G 4/30
See application file for complete search history.

(56) References Cited

U.S. PATENT DOCUMENTS

| | | | |
|---|---|---|---|
| 2011/0141659 A1* | 6/2011 | Chang | H01G 4/30 361/321.2 |
| 2014/0071586 A1* | 3/2014 | Park | H01G 4/30 156/60 |
| 2015/0136462 A1* | 5/2015 | Lee | H01G 4/30 361/301.4 |

(Continued)

FOREIGN PATENT DOCUMENTS

| | | | |
|---|---|---|---|
| JP | H08298227 A | * | 11/1996 |
| JP | H08316086 A | * | 11/1996 |

(Continued)

*Primary Examiner* — Nathan Milakovich
(74) *Attorney, Agent, or Firm* — Morgan, Lewis & Bockius LLP

(57) ABSTRACT

A multilayer electronic component includes a body including a dielectric layer and a plurality of internal electrodes laminated with the dielectric layer interposed therebetween; and an external electrode disposed on the body and connected to the plurality of internal electrodes. The plurality of internal electrodes includes two or more internal electrodes having different thicknesses, a most thick internal electrode having a greatest thickness and a least thick internal electrode having a lowest thickness among the plurality of internal electrodes are disposed on first and second outermost sides opposing each other in a lamination direction of the plurality of internal electrodes. Each internal electrode disposed between the most thick internal electrode and the least thick internal electrode has a thickness the same as or greater than a thickness of an adjacent internal electrode, which is adjacent to that internal electrode in the lamination direction toward the second outermost side.

28 Claims, 4 Drawing Sheets

(56) References Cited

U.S. PATENT DOCUMENTS

2020/0118748 A1* 4/2020 Kim ...................... H01G 4/012
2022/0068561 A1* 3/2022 Sasaki .................... H01G 4/232

FOREIGN PATENT DOCUMENTS

| JP | 3681900 B2 | 8/2005 |
| JP | 2007158266 A * | 6/2007 |
| KR | 10-2011-0068232 A | 6/2011 |
| KR | 10-2019-0121200 A | 10/2019 |

* cited by examiner

MULTILAYER ELECTRONIC COMPONENT

CROSS-REFERENCE TO RELATED APPLICATION(S)

This application claims the benefit of priority to Korean Patent Application No. 10-2020-0174343 filed on Dec. 14, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of various types of electronic products such as an image display device including as a liquid crystal display (LCD) and a plasma display panel (PDP), a computer, smartphones, mobile phones, or the like, and may charge or discharge electricity.

Such a multilayer ceramic capacitor may be used as a component of various electronic devices as a multilayer ceramic capacitor may have a small size and high capacitance, and may be easily mounted. As components of electronic devices have been designed to have a reduced size, demands for miniaturization and high capacitance of a multilayer ceramic capacitor have increased.

As a multilayer ceramic capacitor having high capacitance with an increased number of laminated internal electrodes has been developed, imbalance of interlayer current density of the internal electrodes disposed in the capacitor may increase.

In other words, as a deviation of an electrical path according to a distance between a mounting board and an internal electrode increases, an imbalance in current density in which current is concentrated in the internal electrode disposed adjacent to the mounting board may occur, which may become a factor in deteriorating product reliability of a multilayer ceramic capacitor.

Accordingly, along with the technical demand for miniaturization and high capacitance of a multilayer ceramic capacitor, a technique for reducing the imbalance in current density occurring between internal electrodes disposed at different distances from the mounting board may be necessary.

SUMMARY

An aspect of the present disclosure is to provide a multilayer electronic component which may reduce an imbalance in current density between internal electrodes disposed at different distances from a mounting board.

According to an aspect of the present disclosure, a multilayer electronic component includes a body including a dielectric layer and a plurality of internal electrodes laminated with the dielectric layer interposed therebetween; and an external electrode disposed on the body and connected to the plurality of internal electrodes. The plurality of internal electrodes may include two or more internal electrodes having different thicknesses. A most thick internal electrode having a greatest thickness and a least thick internal electrode having a lowest thickness among the plurality of internal electrodes are disposed on first and second outermost sides opposing each other in a lamination direction of the plurality of internal electrodes. Each internal electrode disposed between the most thick internal electrode and the least thick internal electrode has a thickness the same as or greater than a thickness of an adjacent internal electrode, which is adjacent to that internal electrode in the lamination direction toward the second outermost side.

According to another aspect of the present disclosure, a multilayer electronic component includes a body including a dielectric layer and a plurality of internal electrodes laminated with the dielectric layer interposed between the plurality of internal electrodes. The plurality of internal electrodes includes a most thick internal electrode having a greatest thickness among the plurality of internal electrodes disposed on a first outermost side, and a least thick internal electrode having a lowest thickness among the plurality of internal electrodes disposed on a second outermost side, the first and second outermost sides opposing each other in a lamination direction of the plurality of internal electrodes. The plurality of internal electrodes are disposed such that a thickness of each of the plurality of internal electrodes gradually decreases from the first outermost side to the second outermost side.

According to yet another aspect of the present disclosure, a multilayer electronic component includes a body including a dielectric layer and a plurality of internal electrodes laminated with the dielectric layer interposed between the plurality of internal electrodes. The plurality of internal electrodes includes a most thick internal electrode having a greatest thickness among the plurality of internal electrodes disposed on a bottom outermost side, and a least thick internal electrode having a lowest thickness among the plurality of internal electrodes disposed on a top outermost side, the top and bottom outermost sides opposing each other in a lamination direction of the plurality of internal electrodes. The plurality of internal electrodes are disposed such that a thickness of each of the plurality of internal electrodes gradually increases from the top outermost side to the bottom outermost side.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
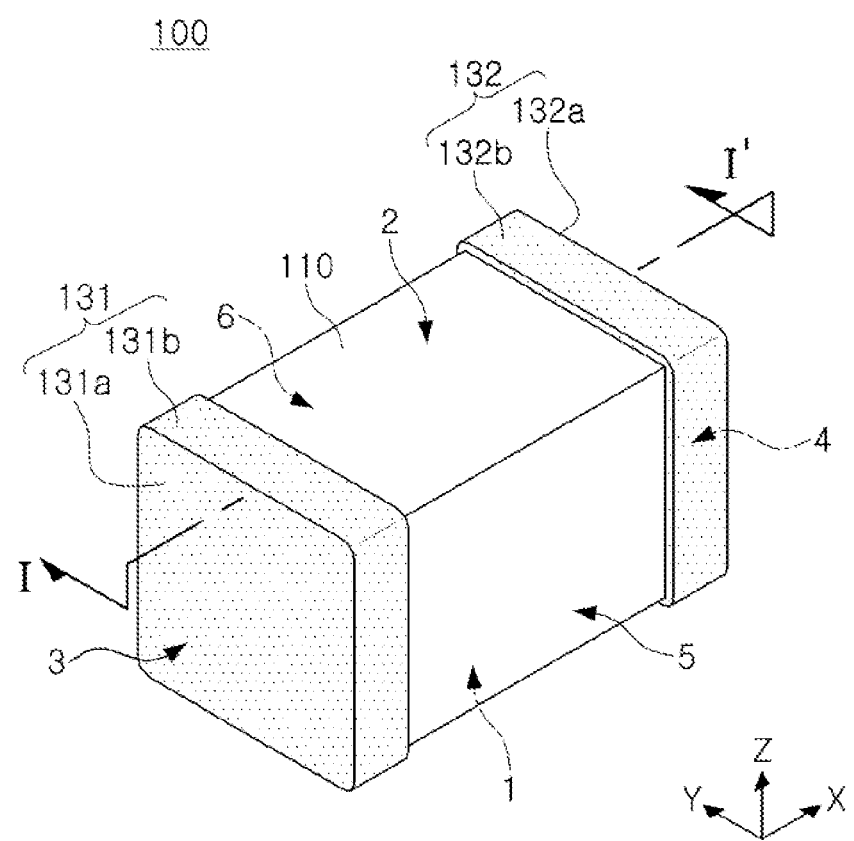
FIG. 1 is a perspective diagram illustrating a multilayer electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Shapes and sizes of elements in the drawings may be exaggerated for clarity of description, and elements indicated by the same reference numeral are same elements in the drawings.

Also, it will be understood that when a portion "includes" an element, it may further include another element, not excluding another element, unless otherwise indicated.

As for the directions to clearly describe an example embodiment, X, Y, and Z in the drawings represent a length direction, a width direction, and a thickness direction of a multilayer electronic component, respectively.

Also, in example embodiments, a length direction may be an X direction or a first direction, a width direction may be a Y direction or a second direction, and the thickness direction may be a Z direction, a third direction, or a lamination direction.

Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In this specification, that a member is disposed "on" a certain component includes not only the case where the member is disposed in direct contact with the component, but also the case where another component is disposed between the component and the member.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

Multilayer Electronic Component

Figure 2A:
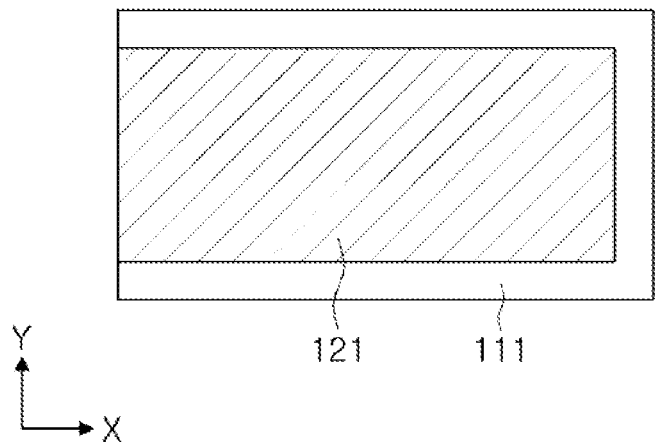
FIGS. 2A and 2B are plan diagrams illustrating each of first and second internal electrodes included in a multilayer electronic component.
Figure 2B:
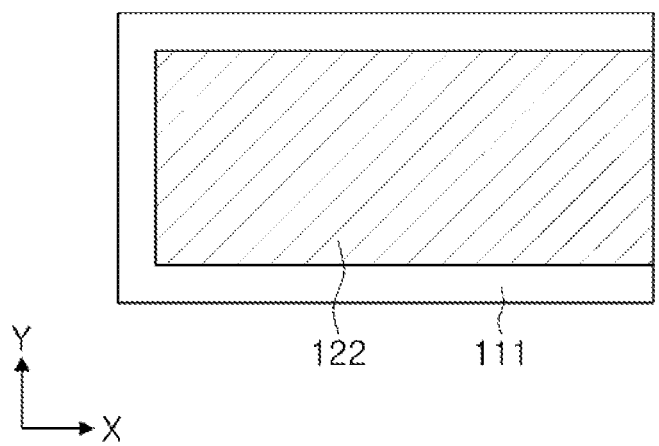
Figure 3:
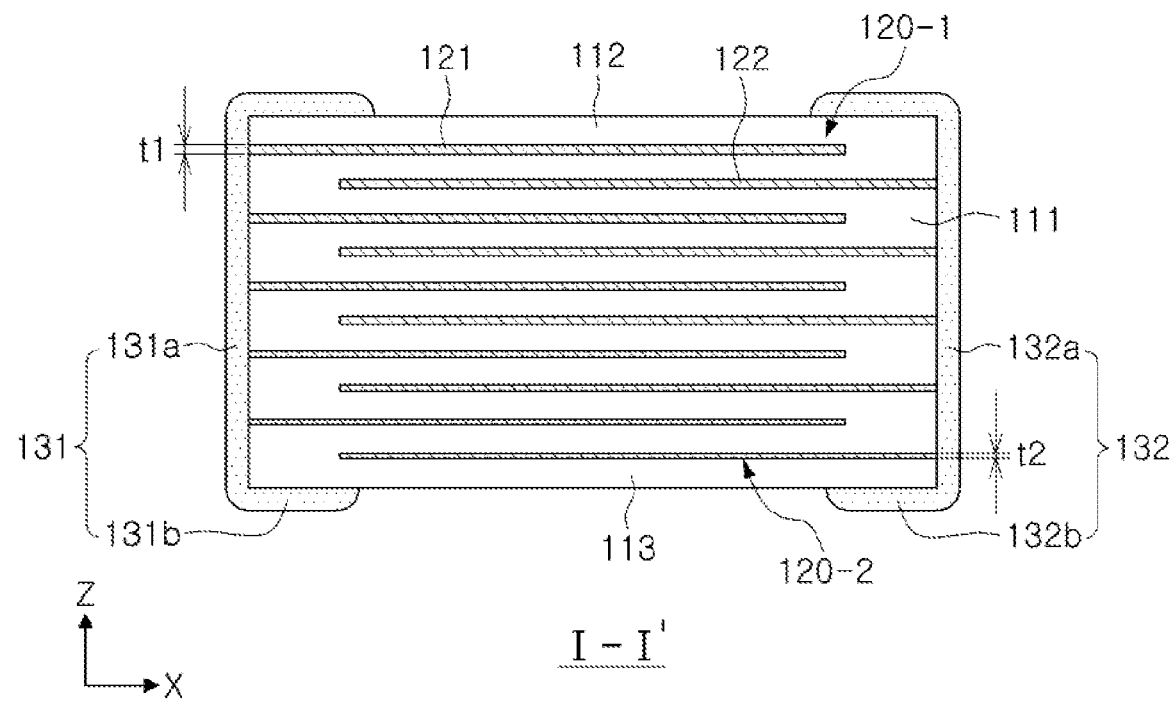
FIG. 3 is a cross-sectional diagram taken along line I-I' in FIG. 1.

FIG. 1 is a perspective diagram illustrating a multilayer electronic component according to an example embodiment. FIGS. 2A and 2B are plan diagrams illustrating each of first and second internal electrodes included in a multilayer electronic component. FIG. 3 is a cross-sectional diagram taken along line I-I' in FIG. 1.

In the description below, a multilayer electronic component according to an example embodiment will be described with reference to FIGS. 1 to 3.

The multilayer electronic component 100 in the example embodiment may include a body 110 including a dielectric layer 111 and a plurality of internal electrodes 121 and 122 laminated with the dielectric layer 111 interposed therebetween, and external electrodes 131 and 132 disposed on the body 110 and connected to the plurality of internal electrodes 121 and 122.

The body 110 may be formed by alternately laminating the dielectric layers 111 and the internal electrodes 121 and 122.

A shape of the body 110 is not limited to any particular shape, and may have a hexahedral shape or a shape similar to a hexahedron as illustrated in the diagram. Due to reduction of ceramic powder included in the body 110 during a baking process, the body 110 may have a substantially hexahedral shape.

The body 110 may have first and second surfaces 1 and 2 opposing each other in the thickness direction (Z direction), third and fourth surfaces 3 and 4 connected to the first and second surfaces 1 and 2 and opposing each other in the width direction (X direction), and fifth and sixth surfaces 5 and 6 connected to the first to fourth surfaces 1, 2, 3, and 4 and opposing each other in the length direction (Y direction).

The plurality of dielectric layers 111 forming the body 110 may be in a baked state, and boundaries between the dielectric layers 111 adjacent to each other may be integrated such that it may be difficult to identify the boundaries without using a scanning electron microscope (SEM).

A material for forming the dielectric layer 111 is not limited to any particular material as long as sufficient capacitance may be obtained therewith. For example, a barium titanate material, a lead composite perovskite material, a strontium titanate material, or the like, may be used.

Also, a material for forming the dielectric layers 111 may further include various ceramic additives, organic solvents, binders, and dispersants in addition to powder such as barium titanate ($BaTiO_3$).

The body 110 may include a capacitance forming portion in which the plurality of internal electrodes 121 and 122 are disposed, and upper and lower cover portions 112 and 113 disposed on both ends of the capacitance forming portion in the lamination direction (Z direction) of the plurality of internal electrodes 121 and 122, respectively.

The capacitance forming portion may contribute to formation of capacitance of the capacitor, and may be formed by alternately disposing the plurality of internal electrodes 121 and 122 with the dielectric layer 111 interposed therebetween.

The upper cover portion 112 and the lower cover portion 113 may be formed by laminating a single dielectric layer or two or more dielectric layers above and below the capacitance forming portion in the thickness direction, and may prevent damages to the internal electrode caused by physical or chemical stress.

The upper cover portion 112 and the lower cover portion 113 may not include internal electrodes, and may include the same material as a material of the dielectric layer 111. In other words, the upper cover portion 112 and the lower cover portion 113 may include a ceramic material, a barium titanate ($BaTiO_3$) ceramic material, for example.

The plurality of internal electrodes 121 and 122 may be alternately laminated with the dielectric layer 111.

The first and second external electrodes 131 and 132 may be formed on both end surfaces of the body 110 in the first direction (X direction), and the plurality of internal electrodes 121 and 122 may include first and second internal electrodes 121 and 122 connected to the first and second external electrodes 131 and 132, respectively.

The first and second internal electrodes 121 and 122 may be alternately disposed to oppose each other with the dielectric layer 111 forming the body 110 interposed therebetween, and may be exposed to the third and fourth surfaces 3 and 4 of the body 110, respectively.

Referring to FIGS. 1 to 3, the first and second internal electrodes 121 and 122 may be exposed to the third and fourth surfaces 3 and 4 of the body 110, respectively. Specifically, the first internal electrode 121 may be spaced apart from the fourth surface 4 and may be exposed through the third surface 3, and the second internal electrode 122 may be spaced apart from the third surface 3 and may be exposed through the fourth surface 4.

The first external electrode 131 may be disposed on the third surface 3 of the body 110 and may be connected to the first internal electrode 121, and the second external electrode 132 may be disposed on the fourth surface 4 of the body and may be connected to the second internal electrode 122.

In this case, the first external electrode 131 and the second internal electrode 122 may be spaced apart from each other in the first direction (X direction), and the second external electrode 132 and the first internal electrode 121 may be spaced apart from each other in the first direction (X direction), respectively. The shortest spacing distance between the first external electrode 131 and the second internal electrode 122 may be the same as the shortest spacing distance between the second external electrode 132 and the first internal electrode 121.

Referring to FIGS. 2A and 2B, the body 110 may be formed by laminating the dielectric layer 111 on which a first internal electrode 121 is printed and laminating the dielectric layer 111 on which the second internal electrode 122 is printed in the thickness direction (Z direction), and baking the dielectric layers.

In this case, the first and second internal electrodes 121 and 122 may be electrically separated from each other by the dielectric layer 111 disposed therebetween.

A material for forming the first and second internal electrodes 121 and 122 is not limited to any particular material, and may be formed using a conductive paste formed of at least one of a noble metal material or nickel (Ni) and copper (Cu).

As a method of printing the conductive paste, a screen-printing method or a gravure printing method may be used, and an example embodiment thereof is not limited thereto.

The external electrodes 131 and 132 may be disposed on the body 110 and may be connected to the internal electrodes 121 and 122.

As illustrated in FIGS. 1 to 3, the external electrodes 131 and 132 may include the first and second external electrodes 131 and 132 disposed on the third and fourth surfaces 3 and 4 of the body 110, respectively, and connected to the first and second internal electrodes 121 and 122, respectively.

In the example embodiment, the structure in which the multilayer electronic component 100 has two external electrodes 131 and 132 is described, but the number or the shape of the external electrodes 131 and 132 may be varied depending on the shape of the internal electrodes 121 and 122 and other purposes.

The external electrodes 131 and 132 may be formed using various materials having electrical conductivity such as metal, and a specific material may be determined in consideration of electrical properties and structural stability.

For example, the external electrodes 131 and 132 may be baked electrodes including conductive metal and glass, or resin electrodes including conductive metal and resin.

Also, the external electrodes 131 and 132 may have a shape in which a baked electrode and a resin electrode are formed in order on the body 110. Also, the external electrodes 131 and 132 may be formed by transferring a sheet including a conductive metal onto the body 110 or by transferring a sheet including a conductive metal onto the sintered electrode.

A material having excellent electrical conductivity may be used as the conductive metal included in the external electrodes 131 and 132, and the material is not limited to any particular material. For example, the conductive metal may be one or more of nickel (Ni), copper (Cu), and alloys thereof.

The first and second external electrodes 131 and 132 may further include a plating layer. The plating layer may include first and second nickel (Ni) plating layers, and first and second tin (Sn) plating layers covering the first and second nickel plating layers, respectively.

Referring to FIG. 3, the multilayer electronic component 100 in the example embodiment may include two or more internal electrodes 121 and 122 having different thicknesses.

In example embodiments, "thickness" may refer to a thickness of a member measured in a direction perpendicular to a surface of the member, and a thickness of the internal electrode may refer to an average thickness.

Specifically, the "average thickness" may refer to an arithmetic mean of the thicknesses measured at 10 points at the same interval on the region of a cross-sectional surface of the multilayer electronic component crossing a center of the multilayer electronic component taken in a direction perpendicular to the Z axis, the region in which the internal electrode is disposed.

According to the example embodiment, among the plurality of internal electrodes 121 and 122, an internal electrode having the greatest thickness ("a most thick internal electrode") and an internal electrode having the lowest thickness ("a least thick internal electrode") may be disposed on first and second outermost sides 120-1 and 120-2 opposing in the lamination direction (Z direction) of the plurality of internal electrodes 121 and 122. Each of the internal electrodes disposed between the most thick internal electrode and the least thick internal electrode may have a thickness the same as or greater than that of an adjacent internal electrode, which is adjacent to that internal electrode in the lamination direction toward the second outermost side 120-2.

Specifically, as illustrated in FIG. 3, among the plurality of internal electrodes 121 and 122 disposed on the body 110, an internal electrode having the largest average thickness may be disposed on the first outermost side 120-1 of the body 110. The first outermost side 120-1 may correspond to one of the two internal electrodes disposed on the outermost side with respect to the lamination direction (Z direction), from among the plurality of internal electrodes 121 and 122.

Accordingly, the first outermost side 120-1 may correspond to the internal electrode most adjacent to the first surface 1 of the body 110, or may correspond to the internal electrode most adjacent to the second surface 2 of the body 110.

Similarly, among the plurality of internal electrodes 121 and 122 disposed on the body 110, the internal electrode having the least average thickness may be disposed on the second outermost side 120-2 of the body 110. The second outermost side 120-2 may correspond to the other of the two internal electrodes (other than the internal electrode disposed on the first outermost side 120-1) disposed on the outermost side in the lamination direction (Z direction), from among the plurality of internal electrodes 121 and 122.

Thus, the second outermost 120-2 may correspond to the internal electrode most adjacent to the first surface 1 of the body 110, or may correspond to the internal electrode most adjacent to the second surface 2 of the body 110.

As an example, when the first outermost side 120-1, on which the internal electrode having the greatest thickness is disposed, is disposed to be adjacent to the second surface 2 of the body 110, the second outermost side 120-2 on which the internal electrode having the lowest thickness is disposed may be disposed to be adjacent to the first surface 1 of the body 110. In this case, the second outermost side 120-2 may correspond to an internal electrode most adjacent to amounting surface when the multilayer electronic component 100 is mounted on the printed circuit board.

When the first outermost side 120-1, on which the internal electrode having the greatest thickness is disposed, is disposed to be adjacent to the first surface 1 of the body 110, the second outermost side 120-2 on which the internal electrode having the lowest thickness is disposed may be disposed to be adjacent to the second surface 2 of the body 110. In this case, the first outermost side 120-1 may correspond to the internal electrode most adjacent to the mounting surface when the multilayer electronic component 100 is mounted on the printed circuit board.

Referring to FIG. 3, the plurality of internal electrodes 121 and 122 in an example embodiment may be disposed such that the thicknesses thereof may gradually decrease from the first outermost side 120-1 toward the second outermost side 120-2.

In this case, a spacing distance between the plurality of internal electrodes 121 and 122 in the lamination direction (Z direction) may be constant.

As the plurality of internal electrodes 121 and 122 are disposed such the average thickness gradually decreases in one direction, resistances R and parasitic inductances L of the internal electrodes 121 and 122 may be different.

Specifically, according to a general technical level in the technical field to which the present disclosure belongs, resistance and parasitic inductance may decrease as a thickness of a conductor increases, and resistance and parasitic inductance may increase as a thickness of the conductor decreases.

When the internal electrodes 121 and 122 are disposed such that the average thickness thereof gradually decreases from the first outermost side 120-1 toward the second outermost side 120-2, the internal electrode 121 and 122 may have a tendency in which resistance and parasitic inductance thereof may increase from the first outermost side 120-1 toward the second outermost side 120-2.

The thickness of each of the plurality of internal electrodes 121 and 122 may be varied. For example, among the plurality of internal electrodes 121 and 122, when a thickness of the internal electrode disposed on the first outermost side 120-1 is defined as t1, and a thickness of the internal electrode disposed on the second outermost side 120-2 is defined as t2, t1 and t2 may satisfy t1≤2×t2. The thicknesses t1 and t2 may refer to an average thickness of the respective internal electrodes.

When a difference in an average thickness between the internal electrodes disposed on the first and second outermost sides 120-1 and 120-2 exceeds two times, a thickness of the internal electrodes disposed on the first outermost side 120-1 may increase excessively, such that the thickness may not be suitable for miniaturization and high capacitance of the multilayer electronic component 100. When a thickness of the internal electrodes disposed on the second outermost side 120-2 is excessively decreased, connectivity of the electrode may degrade.

In the example embodiment, when a distance at which a current reaches a corresponding internal electrode from a mounting surface of the printed circuit board is defined as an electrical path of the internal electrode, among the plurality of internal electrodes 121 and 122, the internal electrode most adjacent to the mounting surface may have the shortest electrical path, and the internal electrode most farthest from the mounting surface may have the longest electrical path.

With reference to the general technical level in the technical field to which the present disclosure belongs, resistance and parasitic inductance may decrease as a length of a conductor increases, and resistance and parasitic inductance may increase as a length of the conductor decreases. Thus, the longer the electric path, the higher the resistance and parasitic inductance, and the shorter the electric path, the lower the resistance and parasitic inductance.

Accordingly, among the plurality of internal electrodes 121 and 122, the more the internal electrode is adjacent to the mounting surface, the lower the resistance and parasitic inductance may be, and the more the internal electrode is spaced apart from the mounting surface, the higher the resistance and parasitic inductance may be.

As described above, a deviation in resistance and parasitic inductance may occur between the plurality of internal electrodes 121 and 122 disposed in a single multilayer electronic component 100 depending on a difference in electric paths. Accordingly, current may be concentrated in the internal electrode adjacent to the mounting surface, such that an imbalance in current density may occur between the internal electrodes.

According to another example embodiment, when the second outermost layer 120-2 of the multilayer electronic component 100 is disposed on the mounting surface of the printed circuit board, the plurality of internal electrodes 121 and 122 may have a tendency in which the more the plurality of internal electrodes 121 and 122 is spaced apart from the mounting surface, the more the resistance and parasitic inductance may decrease.

When the multilayer electronic component 100 is mounted in the above-mentioned direction, the internal electrode disposed on the second outermost layer 120-2 may have the greatest resistance and parasitic inductance in terms of a thickness of the electrode, and may have the least resistance and parasitic inductance in terms of an electrical path. Also, the internal electrode disposed on the first outermost layer 120-1 may have the least resistance and parasitic inductance in terms of a thickness of the electrode, and may have the greatest resistance and parasitic inductance in terms of an electrical path. Accordingly, deviations in resistance and parasitic inductance for each internal electrode may cancel each other.

Accordingly, when the plurality of internal electrodes 121 and 122 have a tendency in which the more the plurality of internal electrodes 121 and 122 is spaced apart from the mounting surface, the greater the thickness thereof may be, deviations in resistance and parasitic inductance between the internal electrodes may be reduced.

Accordingly, concentration of the current in the internal electrode adjacent to the mounting surface may be prevented, such that an imbalance in current density between the plurality of internal electrodes 121 and 122 may be reduced.

According to another example embodiment, the first outermost layer 120-1 of the multilayer electronic component 100 may be disposed on the mounting surface side of the printed circuit board.

In this case, an effect of reducing equivalent series resistance (ESR) generated in the multilayer electronic component 100 may be obtained.

(Modified Example)

Figure 4:
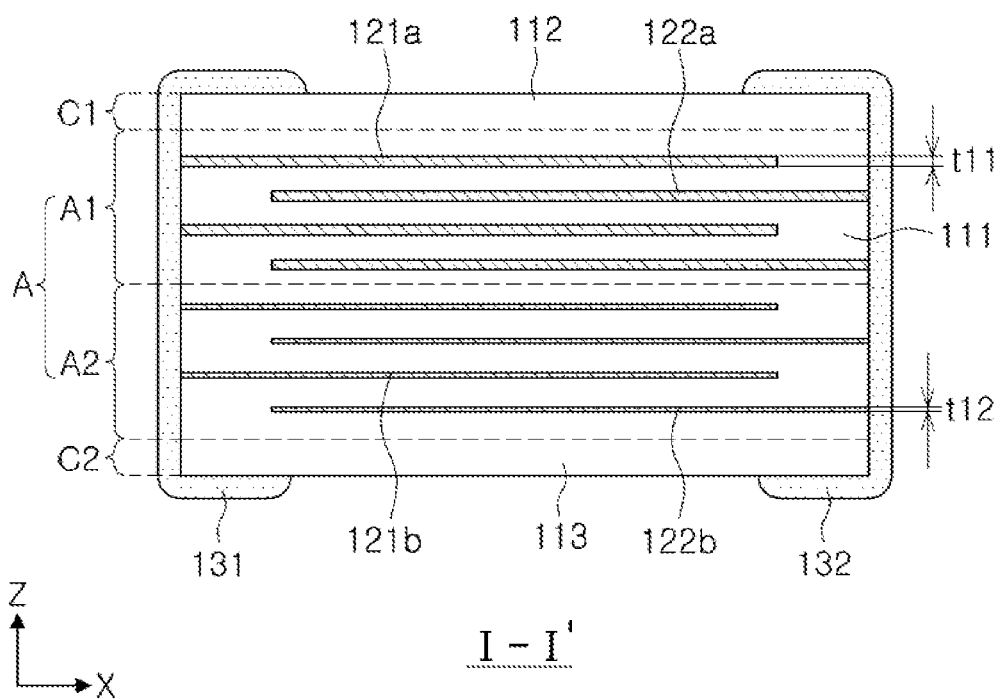
FIG. 4 is a cross-sectional diagram illustrating a first modified example of the example embodiment in FIG. 3.
Figure 5:
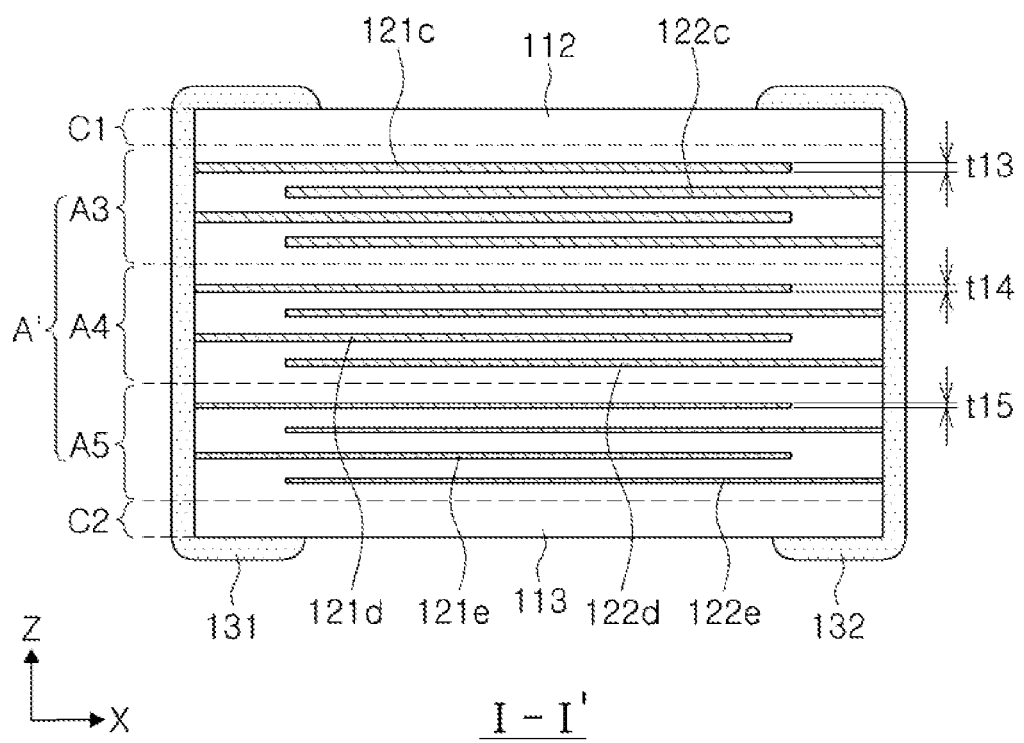
FIG. 5 is a cross-sectional diagram illustrating a second modified example of the example embodiment in FIG. 3.

FIGS. 4 and 5 are cross-sectional diagrams illustrating first and second modified examples of the example embodiment in FIG. 3.

Referring to FIG. 4, the body 110 may include a region C1 corresponding to the upper cover portion 112 and a region C2 corresponding to the lower cover portion 113 on both ends in the lamination direction (Z direction), and may include a capacitance forming portion A including a plurality of internal electrodes between the regions.

The capacitance forming portion A may include a first region A1 including a first outermost side in which the internal electrode having the greatest thickness is disposed, and a second region A2 including a second outermost side in which the internal electrode having the lowest thickness is disposed. In other words, according to the first modified example, the capacitance forming portion A in which the plurality of internal electrodes are disposed may be divided into two regions.

In the first region A1, first internal electrode groups 121a and 122a in which the plurality of internal electrodes having the same average thickness as a thickness of the internal electrodes disposed on the first outermost side are laminated may be disposed. Also, in the second region A2, second internal electrode groups 121b and 122b in which the plurality of internal electrodes having the same average thickness as a thickness of the internal electrodes disposed on the second outermost side are laminated may be disposed.

In the capacitor forming portion A, internal electrodes having two different average thicknesses may be disposed, and the first internal electrode groups including the internal electrodes having a relatively greater or higher thickness may be disposed in the first region A1, and the second internal electrode groups 121b and 122b including the internal electrodes having a relatively lower thickness may be disposed in the second region A2.

Differences in thicknesses of the internal electrodes included in the first and second internal electrode groups 121a, 122a, 121b, and 122b, may be varied. For example, when the thickness of the first internal electrode groups 121a and 122a is defined as t11, and the thickness of the internal electrode disposed in the second internal electrode groups 121b and 122b is defined as t12, t11 and t12 may satisfy t11≤2×t12. The thicknesses t11 and t12 may refer to an average thickness.

When the difference in the average thickness of the internal electrodes included in the first and second internal electrode groups 121a, 122a, 121b, and 122b exceeds two times, the thickness of the internal electrode disposed in the first internal electrode groups 121a and 122a may increase excessively, such that the thickness may not be suitable for miniaturization and high capacitance of the multilayer electronic component 100. When the thickness of the internal electrodes disposed in the second internal electrode groups 121b and 122b is excessively decreased, connectivity of the electrode may degrade.

According to the modified example, a spacing distance between the plurality of internal electrodes disposed in the first and second regions A1 and A2 in the lamination direction (Z direction) may be constant.

In this case, lengths of the first and second regions A1 and A2 of the plurality of internal electrodes in the lamination direction (Z direction) may be the same. In this case, the number of internal electrodes included in the first region A1 may be less than the number of internal electrodes included in the second region A2.

As another example, the numbers of internal electrodes included in the first and second regions A1 and A2 may be the same. In this case, the length of the first region A1 in the lamination direction may be longer than the length of the second region A2 in the lamination direction.

Referring to FIG. 5, the body 110 may include a region C1 corresponding to the upper cover portion 112 and a region C2 corresponding to the lower cover portion 113, and may include a capacitance forming portion A' including a plurality of internal electrodes between the regions.

The capacitance forming portion A' may include three or more regions in which the internal electrodes having different average thicknesses are disposed, and internal electrodes included in the regions of the capacitance forming portion A' may have the same thickness.

For example, as illustrated in FIG. 5, the capacitance forming portion A' may include three regions A3, A4, and A5. In the description below, an example in which the capacitance forming portion A' may include the three regions A3, A4, and A5, and the example may also be applied to the capacitance forming portion A' including difference number of regions.

According to the modified example, the capacitance forming portion A' may include a third region A3 including a first outermost side on which the internal electrode having the greatest thickness among the plurality of internal electrodes is disposed, a fifth region A5 including the second outermost side on which the internal electrode having the lowest thickness among the plurality of internal electrodes is disposed, and a fourth region A4 on which the internal electrode having an intermediate thickness (i.e., a thickness between the greatest thickness and the lowest thickness) is disposed. In the second modified example, the capacitance forming portion A' in which the plurality of internal electrodes are disposed may be divided into three regions.

In this case, in the third region A3, third internal electrode groups 121c and 122c in which a plurality of internal electrodes having the same average thickness as the thickness of the internal electrode disposed on the first outermost side are laminated may be disposed. Also, in the fifth region A5, fifth internal electrode groups 121e and 122e in which a plurality of internal electrodes having the same average thickness as the thickness of the internal electrode disposed on the second outermost side are laminated may be disposed. In the fourth region A4, fourth internal electrode groups 121d and 122d in which a plurality of internal electrodes having a thickness lower than the thickness of the internal electrode disposed on the first outermost side and greater than the thickness of the internal electrode disposed on the second outermost side are laminated may be disposed.

In other words, the internal electrodes having three different average thicknesses may be disposed in the capacitance forming portion A'. The third internal electrode groups 121c and 122c including the internal electrodes having a relatively greater thickness may be disposed in the third region A3, fourth internal electrode groups 121d and 122d including the internal electrodes having an intermediate thickness may be disposed, and fifth internal electrode groups 121e and 122e including the internal electrodes having a relatively lower thickness may be disposed in the fifth region A5.

Differences in the thicknesses of the internal electrodes included in the third to fifth internal electrode groups 121c to 122e may be varied. For example, when the thickness of the third internal electrode groups 121c and 122c is defined as t13, and the thickness of the internal electrodes disposed in the fifth internal electrode groups 121e and 122e is defined as t15, t13 and t15 may satisfy t13≤2×t15. In this case, the thicknesses t13 and t15 may refer to an average thickness.

When the difference in the average thickness of the internal electrodes included in the third and fifth internal electrode groups 121c, 122c, 121e, and 122e exceeds two times, the thickness of the internal electrodes included in the third internal electrode groups 121c and 122c may excessively increase, such that the thickness may not be suitable for miniaturization and high capacitance of the multilayer electronic component 100. Also, the thickness of the internal electrodes disposed in the fifth internal electrode groups 121e and 122e may decrease excessively, such that connectivity of the electrode may degrade.

Also, for example, when the average thickness of the fourth internal electrode groups 121d and 122d is defined as t14, t14 may correspond to the average value of t13 and t15.

According to the modified example, a spacing distance between the plurality of internal electrodes disposed in the third to fifth regions A3, A4, and A5 in the lamination direction (Z direction) may be constant.

In this case, the lengths of the third to fifth regions A3, A4, and A5 of the plurality of internal electrodes in the lamination direction (Z direction) may be the same. In this case, the number of internal electrodes included in the third region A3 may be the lowest and the number of internal electrodes included in the fifth region A5 may be the highest.

As another example, the numbers of internal electrodes included in the third to fifth regions A3, A4, and A5 may be the same. In this case, the length of the third region A3 in the lamination direction may be the longest and the length of the fifth region A5 in the lamination direction may be the shortest.

In the modified example illustrated in FIGS. 4 and 5, the multilayer electronic component may be mounted on a board in different directions according to various example embodiments.

According to an example embodiment, when the second internal electrode groups 121b and 122b or the fifth internal electrode groups 121e and 122e are disposed on the mounting surface of the printed circuit board, the plurality of internal electrodes may have a tendency in which the more the plurality of internal electrodes are spaced apart from the mounting surface, the more the resistance and parasitic inductance may decrease.

When the multilayer electronic component 100 is mounted in the above-mentioned direction, the internal electrodes disposed in the second internal electrode groups 121b and 122b or the fifth internal electrode groups 121e and 122e may have the highest resistance and parasitic inductance in terms of a thickness of the electrodes, and may have the lowest resistance and parasitic inductance in terms of an electric path. Also, the internal electrodes disposed in the first internal electrode groups 121a and 122a or the third internal electrode groups 121c and 122c may have the least resistance and parasitic inductance in terms of a thickness of the electrodes, and may have the greatest resistance and parasitic inductance in terms of an electrical path. Accordingly, deviations in resistance and parasitic inductance for each internal electrode may cancel each other.

Accordingly, when the plurality of internal electrodes have a tendency in which the more the plurality of internal electrodes are spaced apart from the mounting surface, the more the thickness thereof increases, deviations in resistance and parasitic inductance between the internal electrodes may be reduced.

Also, accordingly, concentration of current in the internal electrode adjacent to the mounting surface may be suppressed, such that an imbalance in current density between the plurality of internal electrodes may be reduced.

According to another example embodiment, the first internal electrode groups 121a and 122a or the third internal electrode groups 121c and 122c may be disposed on the mounting surface of the printed circuit board.

In this case, the effect of reducing equivalent series resistance (ESR) generated in the multilayer electronic component 100 may be obtained.

According to the aforementioned example embodiment, by adjusting the resistance and parasitic inductance by varying the thicknesses of the internal electrodes disposed on different levels, the imbalance in current density caused by a deviation in the electrical path between the internal electrodes may be reduced.

While the example embodiments have been illustrated and described above, it will be apparent to those skilled in the art that modifications and variations could be made without departing from the scope in the example embodiment as defined by the appended claims.

What is claimed is:

1. A multilayer electronic component, comprising:
a body including a dielectric layer and a plurality of internal electrodes laminated with the dielectric layer interposed between the plurality of internal electrodes; and
an external electrode disposed on the body and connected to the plurality of internal electrodes,
wherein the plurality of internal electrodes includes two or more internal electrodes having different thicknesses, a most thick internal electrode having a greatest thickness and a least thick internal electrode having a lowest thickness among the plurality of internal electrodes are disposed on first and second outermost sides opposing each other in a lamination direction of the plurality of internal electrodes, and each internal electrode disposed between the most thick internal electrode and the least thick internal electrode has a thickness the same as or greater than a thickness of an adjacent internal electrode, which is adjacent to the internal electrode in the lamination direction toward the second outermost side.

2. The multilayer electronic component of claim 1, wherein the body includes a capacitance forming portion in which the plurality of internal electrodes are disposed, and upper and lower cover portions disposed on both ends of the capacitance forming portion in the lamination direction of the plurality of internal electrodes, respectively.

3. The multilayer electronic component of claim 1, wherein, among the plurality of internal electrodes, when a thickness of the internal electrode disposed on the first outermost side is defined as t1 and a thickness of the internal electrode disposed on the second outermost side is defined as t2, t1 and t2 satisfy $t1 \leq 2 \times t2$.

4. The multilayer electronic component of claim 2,
wherein the capacitance forming portion includes a first region including the first outermost side and a second region including the second outermost side,
wherein, in the first region, a first internal electrode group in which a plurality of internal electrodes having the same thickness as a thickness of the internal electrode disposed on the first outermost side are laminated is disposed, and
wherein, in the second region, a second internal electrode group in which a plurality of internal electrodes having the same thickness as a thickness of the internal electrode disposed on the second outermost side are laminated is disposed.

5. The multilayer electronic component of claim 4, wherein lengths of the first and second regions in the lamination direction of the plurality of internal electrodes are the same.

6. The multilayer electronic component of claim 4, wherein the number of internal electrodes included in the first internal electrode group and the number of internal electrodes included in the second internal electrode group are the same.

7. The multilayer electronic component of claim 2, wherein the capacitance forming portion includes three or more regions in which internal electrodes having different thicknesses are disposed, respectively, and
wherein, in each of the three or more regions, the internal electrodes included in the respective region of the capacitance forming portion have the same thickness.

8. The multilayer electronic component of claim 7, wherein the number of the internal electrodes included in each of the three or more the regions of the capacitance forming portion is the same.

9. The multilayer electronic component of claim 1, wherein a spacing distance between the plurality of internal electrodes in the lamination direction is constant.

10. The multilayer electronic component of claim 1, wherein the plurality of internal electrodes are disposed to have a thickness gradually decreasing from the first outermost side to the second outermost side.

11. The multilayer electronic component of claim 1, wherein the external electrode includes first and second external electrodes disposed on both end surfaces of the body in a first direction different from the lamination direction, respectively, and
wherein the plurality of internal electrodes include first and second internal electrodes connected to the first and second external electrodes, respectively.

12. The multilayer electronic component of claim 11, wherein the first external electrode and the second internal electrode are disposed to be spaced apart from each other in the first direction, and the second external electrode and the first internal electrode are disposed to be spaced apart from each other in the first direction, and shortest spacing distances therebetween are the same.

13. A multilayer electronic component, comprising:
a body including a dielectric layer and a plurality of internal electrodes laminated with the dielectric layer interposed between the plurality of internal electrodes,
wherein the plurality of internal electrodes includes a most thick internal electrode having a greatest thickness among the plurality of internal electrodes disposed on a first outermost side, and a least thick internal electrode having a lowest thickness among the plurality of internal electrodes disposed on a second outermost side, the first and second outermost sides opposing each other in a lamination direction of the plurality of internal electrodes, and the plurality of internal electrodes are disposed such that a thickness of each of the plurality of internal electrodes gradually decreases from the first outermost side to the second outermost side.

14. The multilayer electronic component of claim 13, wherein the body includes a capacitance forming portion in which the plurality of internal electrodes are disposed, and upper and lower cover portions disposed on both ends of the capacitance forming portion in the lamination direction of the plurality of internal electrodes, respectively.

15. The multilayer electronic component of claim 13, wherein, a thickness value t1 of the most thick internal electrode and a thickness value t2 of the least thick internal electrode satisfy the relationship defined as $t1 \leq 2 \times t2$.

16. The multilayer electronic component of claim 14, wherein the capacitance forming portion includes a first region including the first outermost side and a second region including the second outermost side,
wherein, in the first region, a first internal electrode group in which a plurality of internal electrodes having the same thickness as a thickness of the internal electrode disposed on the first outermost side are laminated is disposed, and
wherein, in the second region, a second internal electrode group in which a plurality of internal electrodes having the same thickness as a thickness of the internal electrode disposed on the second outermost side are laminated is disposed.

17. The multilayer electronic component of claim 16, wherein lengths of the first and second regions in the lamination direction of the plurality of internal electrodes are the same.

18. The multilayer electronic component of claim 16, wherein the number of internal electrodes included in the first internal electrode group and the number of internal electrodes included in the second internal electrode group are the same.

19. The multilayer electronic component of claim 14, wherein the capacitance forming portion includes three or more regions in which internal electrodes having different thicknesses are disposed, respectively, and
wherein, in each of the three or more regions, the internal electrodes included in the respective region of the capacitance forming portion have the same thickness, which is different from the thickness of the internal electrodes in the rest of the three or more regions.

20. The multilayer electronic component of claim 19, wherein the number of the internal electrodes included in each of the three or more the regions of the capacitance forming portion is the same.

21. A multilayer electronic component, comprising:
a body including a dielectric layer and a plurality of internal electrodes laminated with the dielectric layer interposed between the plurality of internal electrodes,
wherein the plurality of internal electrodes includes a most thick internal electrode having a greatest thickness among the plurality of internal electrodes disposed on a bottom outermost side, and a least thick internal electrode having a lowest thickness among the plurality of internal electrodes disposed on a top outermost side, the top and bottom outermost sides opposing each other in a lamination direction of the plurality of internal electrodes, and the plurality of internal electrodes are disposed such that a thickness of each of the plurality of internal electrodes gradually increases from the top outermost side to the bottom outermost side.

22. The multilayer electronic component of claim 21, wherein the body includes a capacitance forming portion in which the plurality of internal electrodes are disposed, and upper and lower cover portions disposed on both ends of the capacitance forming portion in the lamination direction of the plurality of internal electrodes, respectively.

23. The multilayer electronic component of claim 21, wherein, a thickness value t1 of the most thick internal electrode and a thickness value t2 of the least thick internal electrode satisfy the relationship defined as $t1 \leq 2 \times t2$.

24. The multilayer electronic component of claim 22, wherein the capacitance forming portion includes a first region including the bottom outermost side and a second region including the top outermost side, wherein, in the first region, a first internal electrode group in which a plurality of internal electrodes having the same thickness as a thickness of the internal electrode disposed on the bottom outermost side are laminated is disposed, and wherein, in the second region, a second internal electrode group in which a plurality of internal electrodes having the same thickness as a thickness of the internal electrode disposed on the top outermost side are laminated is disposed.

25. The multilayer electronic component of claim 24, wherein lengths of the first and second regions in the lamination direction of the plurality of internal electrodes are the same.

26. The multilayer electronic component of claim 24, wherein the number of internal electrodes included in the first internal electrode group and the number of internal electrodes included in the second internal electrode group are the same.

27. The multilayer electronic component of claim 22, wherein the capacitance forming portion includes three or more regions in which internal electrodes having different thicknesses are disposed, respectively, and wherein, in each of the three or more regions, the internal electrodes included in the respective region of the capacitance forming portion have the same thickness, which is different from the thickness of the internal electrodes in the rest of the three or more regions.

28. The multilayer electronic component of claim 27, wherein the number of the internal electrodes included in each of the three or more the regions of the capacitance forming portion is the same.

* * * * *